US012567386B2

(12) United States Patent
Wu

(10) Patent No.: US 12,567,386 B2
(45) Date of Patent: Mar. 3, 2026

(54) DISPLAY DEVICE AND OPERATING METHOD THEREOF FOR CONTROLLING LCD PANEL

(71) Applicant: HIMAX TECHNOLOGIES LIMITED, Tainan (TW)

(72) Inventor: Ilin Wu, Tainan (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 18/637,404

(22) Filed: Apr. 16, 2024

(65) Prior Publication Data

US 2025/0322806 A1 Oct. 16, 2025

(51) Int. Cl.
*G09G 3/36* (2006.01)

(52) U.S. Cl.
CPC ....... *G09G 3/3614* (2013.01); *G09G 2310/08* (2013.01); *G09G 2330/021* (2013.01); *G09G 2330/06* (2013.01)

(58) Field of Classification Search
CPC ............. G09G 3/3614; G09G 2310/08; G09G 2330/021; G09G 2330/06
See application file for complete search history.

(56) References Cited

U.S. PATENT DOCUMENTS 9,047,832 B2 * 6/2015 Bae ........................ G06F 1/3265
10,991,290 B1 * 4/2021 Yang ........................ G09G 3/20
11,605,326 B2 * 3/2023 Hong ........................ G09G 3/20
2005/0134541 A1 6/2005 Jang et al.
2009/0289878 A1 11/2009 Chen
2014/0368562 A1 * 12/2014 Kim ..................... G09G 3/3696 345/694
2015/0123961 A1 5/2015 Park et al.
2016/0180791 A1 * 6/2016 Lee ...................... G09G 3/3614 345/213
2016/0189657 A1 6/2016 Oh
2022/0101768 A1 * 3/2022 Wang ........................ G09G 3/20
2024/0321210 A1 * 9/2024 Kim ..................... G09G 3/3233

OTHER PUBLICATIONS

"Office Action of Taiwan Counterpart Application", issued on Jul. 3, 2025, p. 1-p. 10.

* cited by examiner

*Primary Examiner* — Kwang-Su Yang
(74) *Attorney, Agent, or Firm* — JCIPRNET

(57) ABSTRACT

A display device and an operating method are provided. The display device includes a liquid crystal display (LCD) panel, a driver circuit, a switch circuit, and a timing controller. The LCD panel comprises a plurality of data lines. The driver circuit is configured to provide a first data signal to a first data line of the plurality of data lines in a first frame time. The switch circuit comprises a first switch configured to provide the first data signal to the first data line according to a first control signal. The timing controller is configured to provide the first control signal switching within a first voltage range when the first data signal has a first polarity, and provide the first control signal switching within a second voltage range different from the first voltage range when the first data signal has a second polarity.

16 Claims, 14 Drawing Sheets

DISPLAY DEVICE AND OPERATING METHOD THEREOF FOR CONTROLLING LCD PANEL

BACKGROUND

1. Technical Field

The disclosure generally relates to a device and a method, and more particularly to a display device and an operating method thereof.

2. Description of Related Art

With the population of large-scale display devices, it becomes important to improve the power consumption and electromagnetic interference (EMI) issues so as to provide high display quality on the large-scale devices.

SUMMARY

Accordingly, the disclosure is directed to a display device and an operating method for improving power consumption and EMI of the display device.

The display device of the present disclosure includes a liquid crystal display (LCD) panel, a driver circuit, a switch circuit, and a timing controller. The LCD panel comprises a plurality of data lines. The driver circuit is configured to provide a first data signal to a first data line of the plurality of data lines in a first frame time. The switch circuit comprises a first switch configured to provide the first data signal to the first data line according to a first control signal. The timing controller is configured to provide the first control signal switching within a first voltage range when the first data signal has a first polarity, and provide the first control signal switching within a second voltage range different from the first voltage range when the first data signal has a second polarity.

The operating method of the present disclosure is for operating a display device. The operating method includes providing a first data signal to a first data line of a liquid crystal display (LCD) panel of the display device through a first switch of a switch circuit of the display device in a first frame time; and using a first control signal to control the first switch.

wherein when the first data signal has a first polarity, the first control signal is switching within a first voltage range, and when the first data signal has a second polarity different from the first polarity, the first control signal is switching within a second voltage range.

The display device of the present disclosure includes a liquid crystal display (LCD) panel, a driver circuit, a switch circuit, and a timing controller. The LCD panel comprises a plurality of data lines. The driver circuit is configured to provide a first data signal to a first data line of the plurality of data lines in a first frame time, wherein the first frame time is divided into a plurality of line times. The switch circuit comprises a first switch configured to provide the first data signal to the first data line according to a first control signal. The timing controller is configured to provide the first control signal only switched once from a high voltage level to a low voltage level or from the low voltage level to the high voltage level in each line time.

The operating method of the present disclosure is for operating a display device. The operating method includes providing a first data signal to a first data line of a liquid crystal display (LCD) panel of the display device through a first switch of a switch circuit of the display device in a first frame time, wherein the first frame time is divided into a plurality of line times; and providing a first control signal only switched once from a high voltage level to a low voltage level or from the low voltage level to the high voltage level in each line time to control the first switch.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
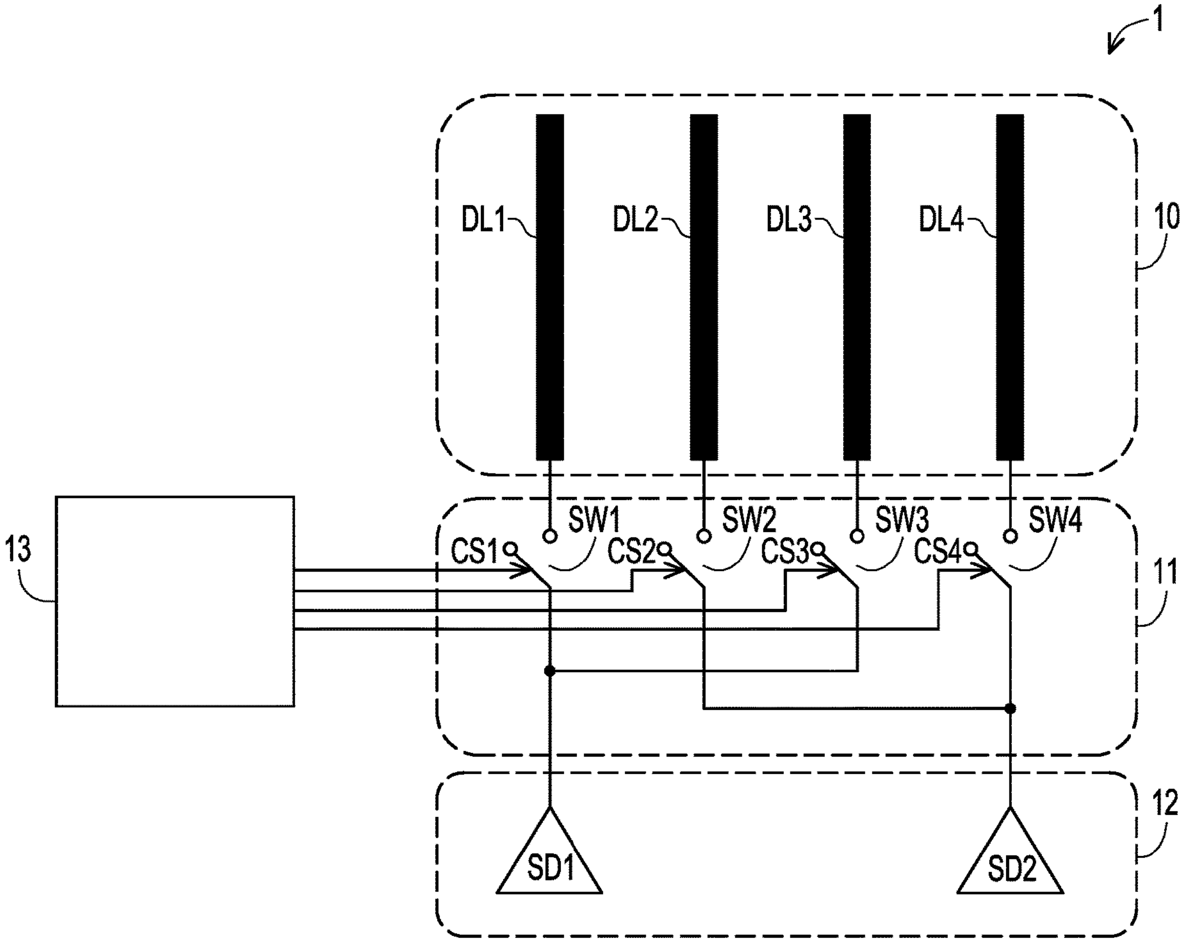
FIG. 1 illustrates a display device according to some embodiments of the present disclosure.

FIG. 1 illustrates a display device 1 according to some embodiments of the present disclosure. The display device 1 includes a liquid crystal display (LCD) panel 10, a switch circuit 11, a driver circuit 12, and a timing controller 13. The LCD panel 10 includes data lines DL1-DLA each coupled to corresponding pixels (not illustrated in FIG. 1) for providing appropriate display data. The driver circuit 12 is configured to provide data signals to the data lines DL1-DLA through the switch circuit 11 so each pixel may retrieve the display data from the corresponding data line. In order to control operations of the switch circuit 11, the timing controller 13 is configured to provide control signals CS1-CS4 for controlling switches SW1-SW4 to properly provide the data signals to the corresponding data line at appropriate time intervals.

Specifically, polarity inversion is used for driving the LCD panel 10, which means that a polarity of the data signal that provided to each data line will be reversed in every frame time for obtaining a better display quality.

The driver circuit 12 includes a first source driver SD1 and a second source driver SD2 which are configured to provide the data signals to the data lines DL1-DLA through the switches SW1-SW4. The first source drivers SD1 and the second source driver SD2 are configured to provide the data signals with opposite polarities in the same frame time. Specifically, in a first frame time, the first source driver SD1 is configured to provide the data signals having the first polarity to the first data line DL1 and the third data line DL3 respectively through the first switch SW1 and the third switch SW3, and the second source driver SD2 is configured to provide the data signals having the second polarity to the second data line DL2 and the fourth data line DLA respectively through the second switch SW2 and the fourth switch SW4. In a second frame time consecutive to the first frame time, the first source driver SD1 turns to provide the data signals having the second polarity to the first data line DL1 and the third data line DL3, and the second source driver SD2 turns to provide the data signals having the first polarity to the second data line DL2 and the fourth data line DL4. In this way, data signals provided to the data lines DL1-DLA in the first frame time and the second frame time are reversed, thereby realizing the polarity inversion.

Further, in order to control operations of the first switch SW1 to the fourth switch SW4, the first control signal CS1 to the fourth control signal CS4 are provided from the timing controller 13 to respectively control the first switch SW1 to the fourth switch SW4 to be turned on (conductive) or cutoff (nonconductive). Specifically, the voltage range of the control signals CS1-CS4 will be controlled corresponding to the polarity of the data signals which the same switch receives. The timing controller 13 may be configured to control the first control signal CS1 switching within a first voltage range when the first data signal has the first polarity, and control the first control signal CS1 switching within a second voltage range different from the first voltage range when the first data signal has the second polarity. For example, when the first polarity and the second polarity are respectively a positive polarity and a negative polarity, the first voltage range and the second voltage range respectively corresponding to the first polarity and the second polarity may be set to a higher voltage range and a lower voltage range. More specifically, a high and low voltage levels of the first voltage range are respectively higher than a high and low voltage levels of the second voltage range.

Taking a positive polarity as the first polarity as an example, the first data signal generated by the first source driver SD1 is within, for example, a voltage range of 0V to 5V. Correspondingly, the first control signal CS1 is controlled within, for example, a first voltage range between −5V and 12V. The first control signal CSI covers a wider voltage range than the first data signal which ensures that a voltage difference between a control end and an input end of the switch is large enough or low enough to control the first switch SW1 properly turned on or cutoff. On the other hand, in another example that the first polarity is a negative polarity, the first data signal generated by the first source driver SD1 is within, for example, a voltage range of −5V to 0V. In this way, the first control signal CS1 is controlled within, for example, the second voltage range of between −7V and 5V. Similarly, the second voltage range of the first control signal CS1 may also properly control the first switch SW receiving the first data signal to be turned on or cutoff without leakage.

Figure 2:
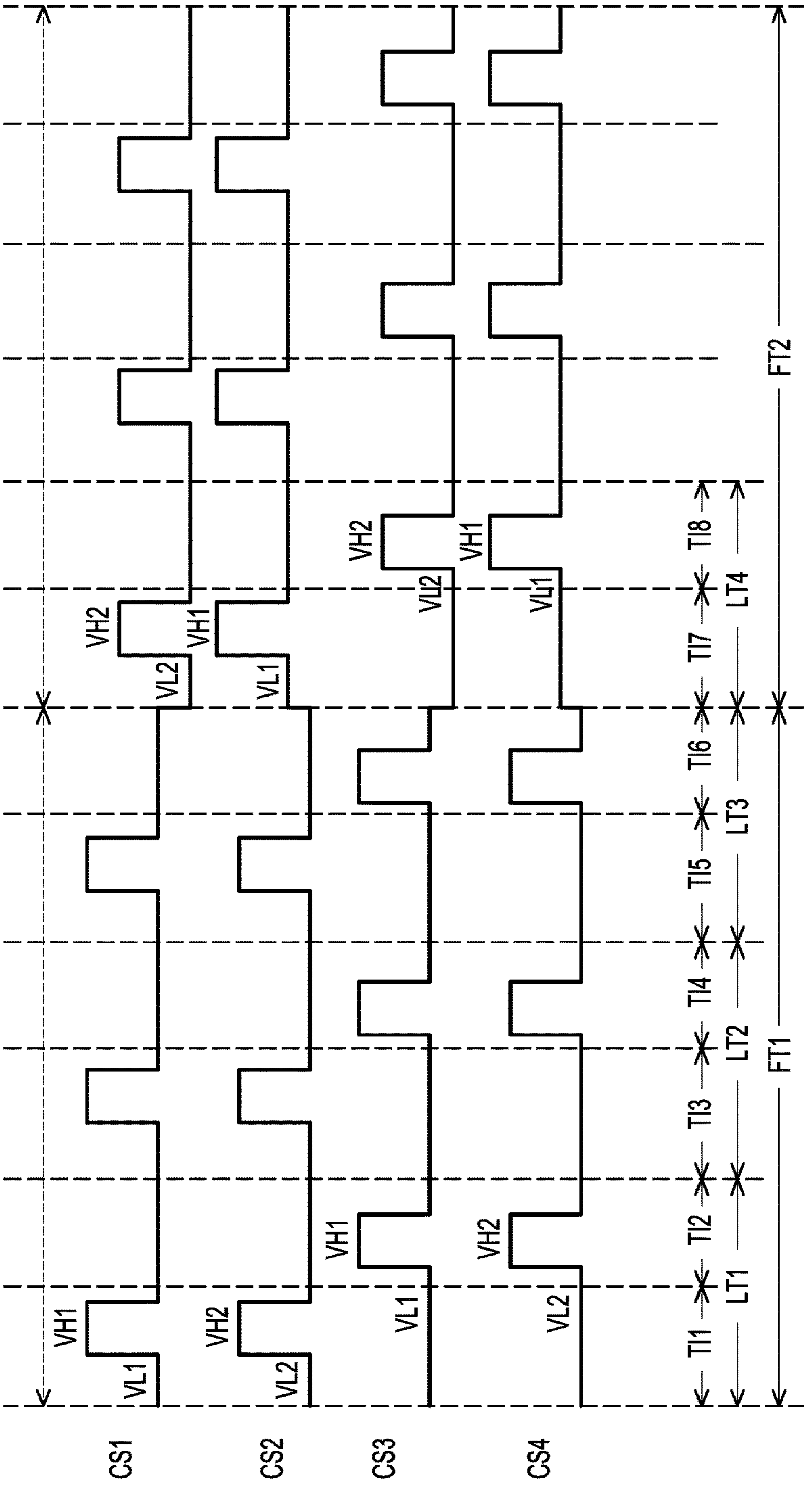
FIG. 2 illustrates an operating waveform of the display device according to some embodiments of the present disclosure.

FIG. 2 illustrates an operating waveform of the display device 1 according to some embodiments of the present disclosure. In FIG. 2, waveforms of the control signals CS1-CS4 are illustrated showing how the control signals CS1-CS4 are switched within a first frame time FT1 and a second frame time FT2. In this embodiment, each frame time is divided into multiple line times, and each line time includes two time intervals.

Figure 3A:
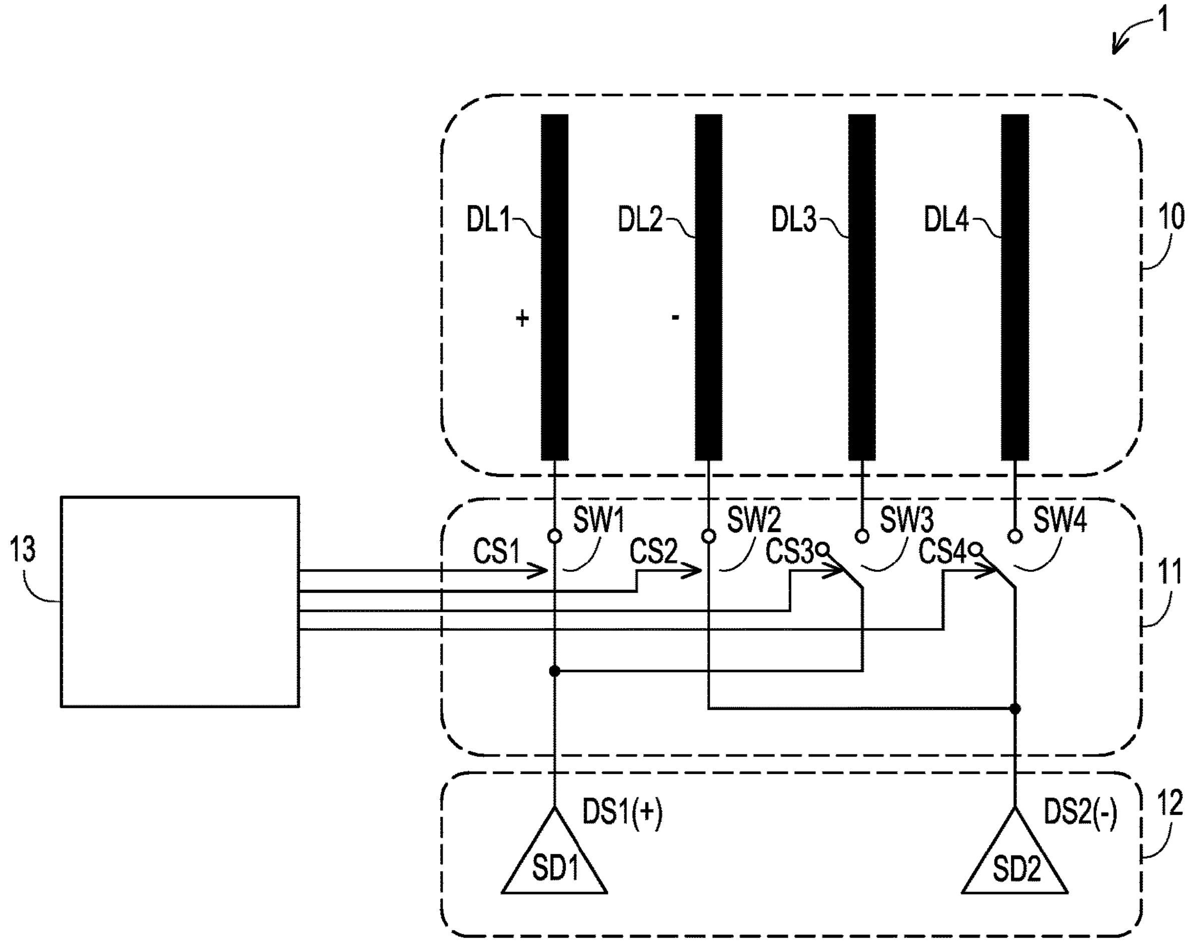
FIG. 3A illustrates operations of the display device during the first time interval in the first line time in FIG. 2 according to some embodiments of the present disclosure.

FIG. 3A illustrates operations of the display device 1 during the first time interval TI1 in the first line time LT1 in FIG. 2 according to some embodiments of the present disclosure. Please refer to FIG. 2 and FIG. 3A together for better understanding the following paragraphs about describing operations of the display device 1 during the first time interval TI1.

In this embodiment, in the first time interval TI1, the first source driver DS1 is configured to generate a first data signal DS1 having the positive polarity, and the second source driver DS2 is configured to generate a second data signal DS2 having the negative polarity. As can be seen in FIG. 2, the first control signal CS1 is switched from a low voltage VL1 (e.g.,−5V) to a high voltage level VH1 (e.g., 12V) controlling the first switch SW1 to pass the first data signal DS1 to the first data line DL1. Similarly, the second control signal CS2 is switched from a low voltage level VL2 (e.g., −7V) to a high voltage level VH2 (e.g., 5V) controlling the second switch SW2 to pass the second data signal DS2 to the second data line DL2. However, the third control signal CS3 and the fourth control signal CS4 are respectively kept at the low voltage levels VL1 and VL2.

Figure 3B:
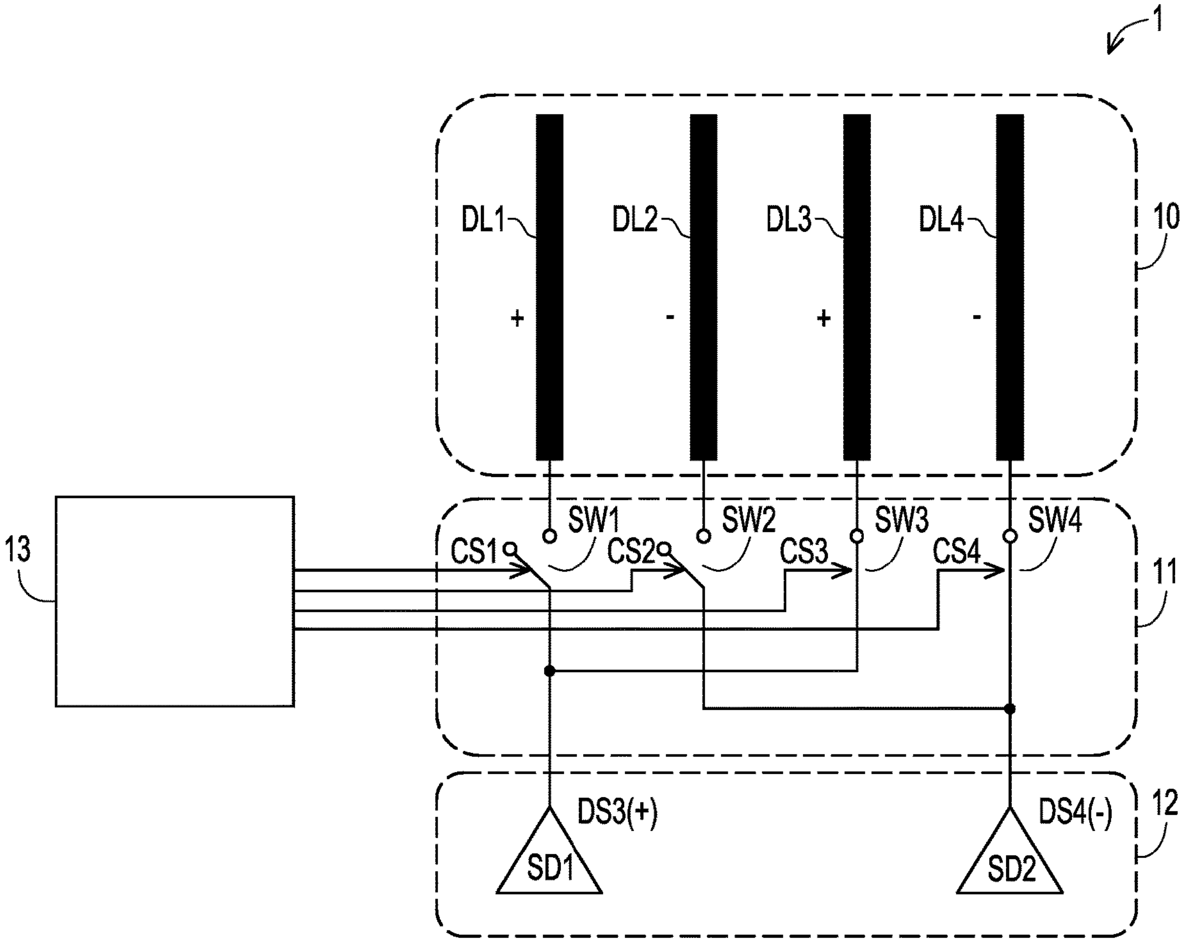
FIG. 3B illustrates operations of the display device during the second time interval in the first line time in FIG. 2 according to some embodiments of the present disclosure.

FIG. 3B illustrates operations of the display device 1 during the second time interval TI2 in the first line time LT1 in FIG. 2 according to some embodiments of the present disclosure. Please refer to FIG. 2 and FIG. 3B together for better understanding the following paragraphs about describing operations of the display device 1 during the second time interval TI2.

Specifically, in the second time interval TI2 consecutive to the first time interval TI1, the first source driver SD1 is configured to generate a third data signal DS3 having the positive polarity, and the second source driver SD2 is configured to generate a fourth data signal DS4 having the negative polarity. As can be seen in FIG. 2, the third control signal CS3 is switched from the low voltage level VLI (e.g., −5V) to the high voltage level VH1 (e.g., 12V) controlling the third switch SW3 to pass the third data signal DS3 to the third data line DL3. Similarly, the fourth control signal CS4 is switched from the low voltage level VL2 (e.g., −7V) to the high voltage level VH2 (e.g., 5V) controlling the fourth switch SW4 to pass the fourth data signal DS4 to the fourth data line DL4. The first control signal CS1 and the second control signal CS2 are respectively kept at the low voltage levels VL1 and VL2. Moreover, similar operations of the first control signal CS1 to the fourth control signal CS4 will be repeated in the second line time LT2 and the third line time LT3 of the first frame time FT1.

Figure 3C:
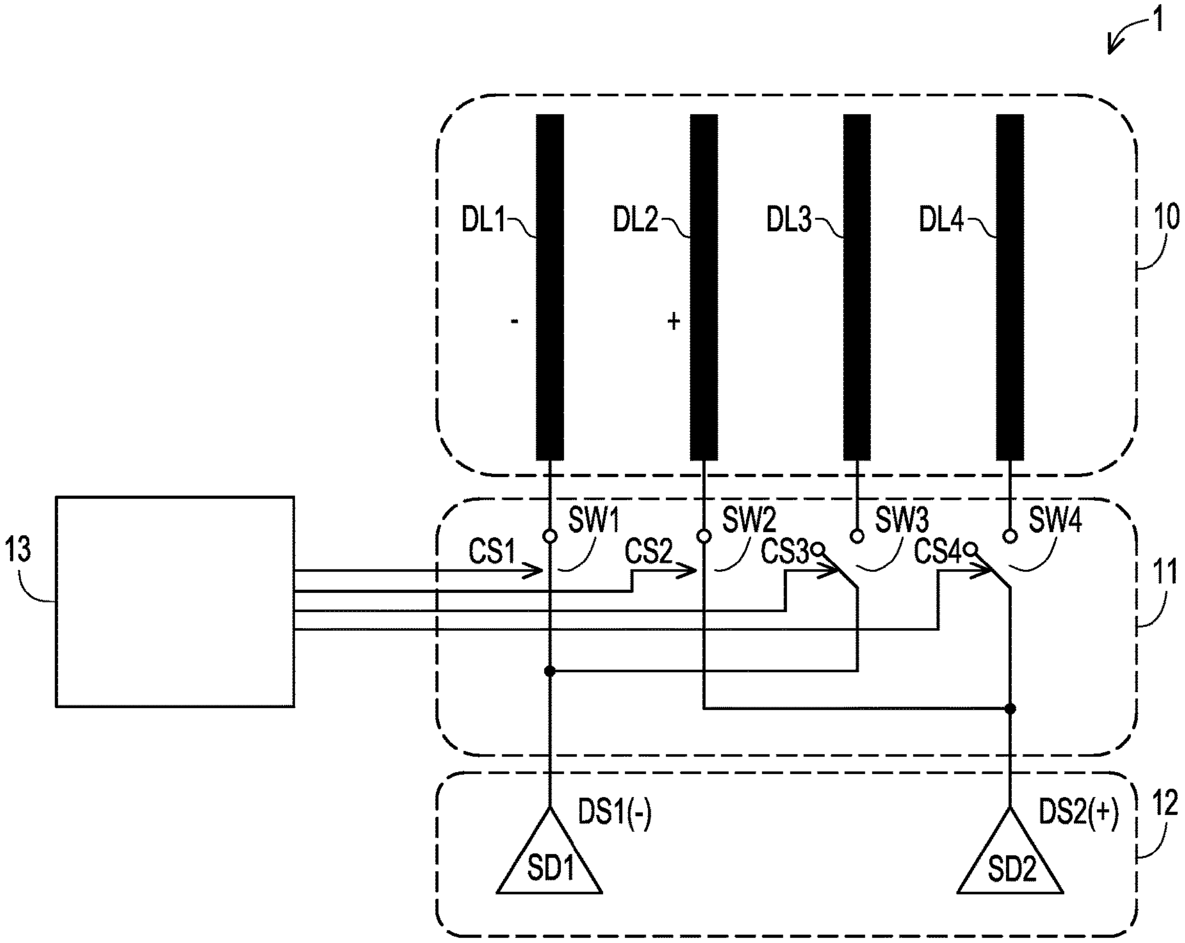
FIG. 3C illustrates operations of the display device during the seventh time interval in the fourth line time according to some embodiments of the present disclosure.

FIG. 3C illustrates operations of the display device 1 during the seventh time interval TI7 in the fourth line time LT4 according to some embodiments of the present disclosure. Please refer to FIG. 2 and FIG. 3C together for better understanding the following paragraphs about describing operations of the display device 1 during the seventh time interval TI7.

When the second frame time FT2 consecutive to the first frame time FT1 is entered, the polarities of the first source driver SD1 and the second source driver SD2 are reversed, and thus the voltage ranges of all control signal are changed. Specifically, since the first data signal DS1 and the third data signal DS3 are changed to the negative polarity, the first control signal CS1 and the third control signal CS3 are lowered from the first voltage range to the second voltage range. On the other hand, since the second data signal DS2 and the fourth data signal DS4 are changed to the positive polarity, the second control signal CS2 and the fourth control signal CS4 are elevated from the second voltage range to the first voltage range.

Specifically, in the seventh time interval TI7, the first source driver DS1 is configured to generate the first data signal DS1 having the negative polarity, and the second source driver DS2 is configured to generate the second data signal DS2 having the positive polarity. As can be seen in FIG. 2, the first control signal CS1 is switched from the low voltage level VL2 (e.g., −7V) to the high voltage level VH2 (e.g., 5V) controlling the first switch SW1 to pass the first data signal DS1 to the first data line DL1. Similarly, the second control signal CS2 is switched from the low voltage level VL1 (e.g., −5V) to a high voltage level VH1 (e.g., 12V) controlling the second switch SW2 to pass the second data signal DS2 to the second data line DL2. However, the third control signal CS3 and the fourth control signal CS4 are respectively kept at the low voltage levels VL2 and VL1.

Figure 3D:
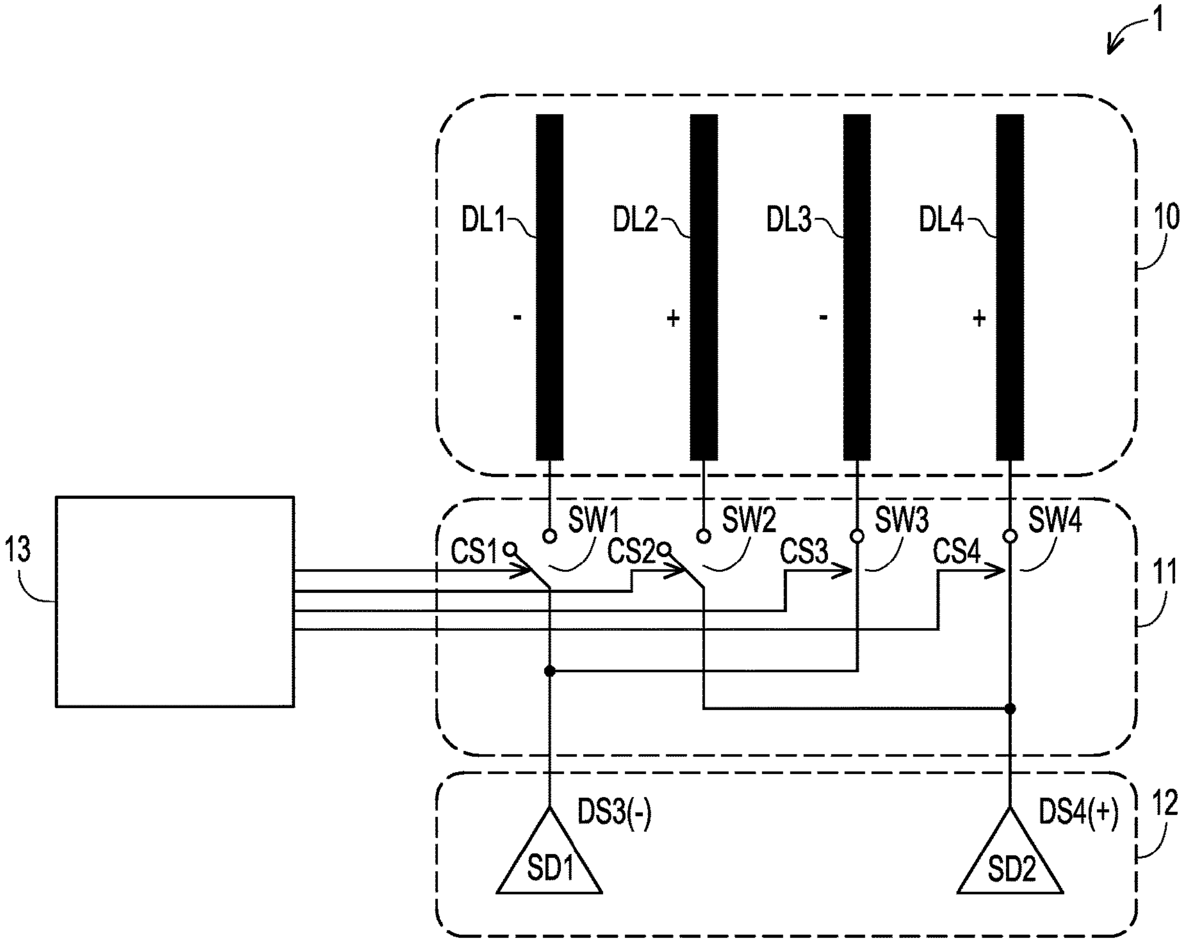
FIG. 3D illustrates operations of the display device during the eighth time interval in the fourth line time according to some embodiments of the present disclosure.

FIG. 3D illustrates operations of the display device 1 during the eighth time interval TI8 in the fourth line time LT4 according to some embodiments of the present disclosure. Please refer to FIG. 2 and FIG. 3D together for better understanding the following paragraphs about describing operations of the display device 1 during the eighth time interval TI8.

Specifically, in the eighth time interval TI8, the first source driver SD1 is configured to generate the third data signal DS3 having the negative polarity, and the second source driver SD2 is configured to generate the fourth data signal DS4 having the positive polarity. As can be seen in FIG. 2, the third control signal CS3 is switched from the low voltage level VL2 (e.g., −7V) to the high voltage level VH2 (e.g., 5V) controlling the third switch SW3 to pass the third data signal DS3 to the third data line DL3. Similarly, the fourth control signal CS4 is switched from the low voltage level VL1 (e.g., −5V) to a high voltage level VH1 (e.g., 12V) controlling the fourth switch SW4 to pass the fourth data signal DS4 to the fourth data line DL4. However, the first control signal CS1 and the second control signal CS2 are respectively kept at the low voltage levels VL2 and VL1.

Therefore, by adaptively adjusting the control signal at the appropriate voltage level corresponding to the polarity of the data signal, voltage swings, power consumption, as well as electromagnetic interference (EMI) of the display device 1 may be effectively alleviated.

Figure 4:
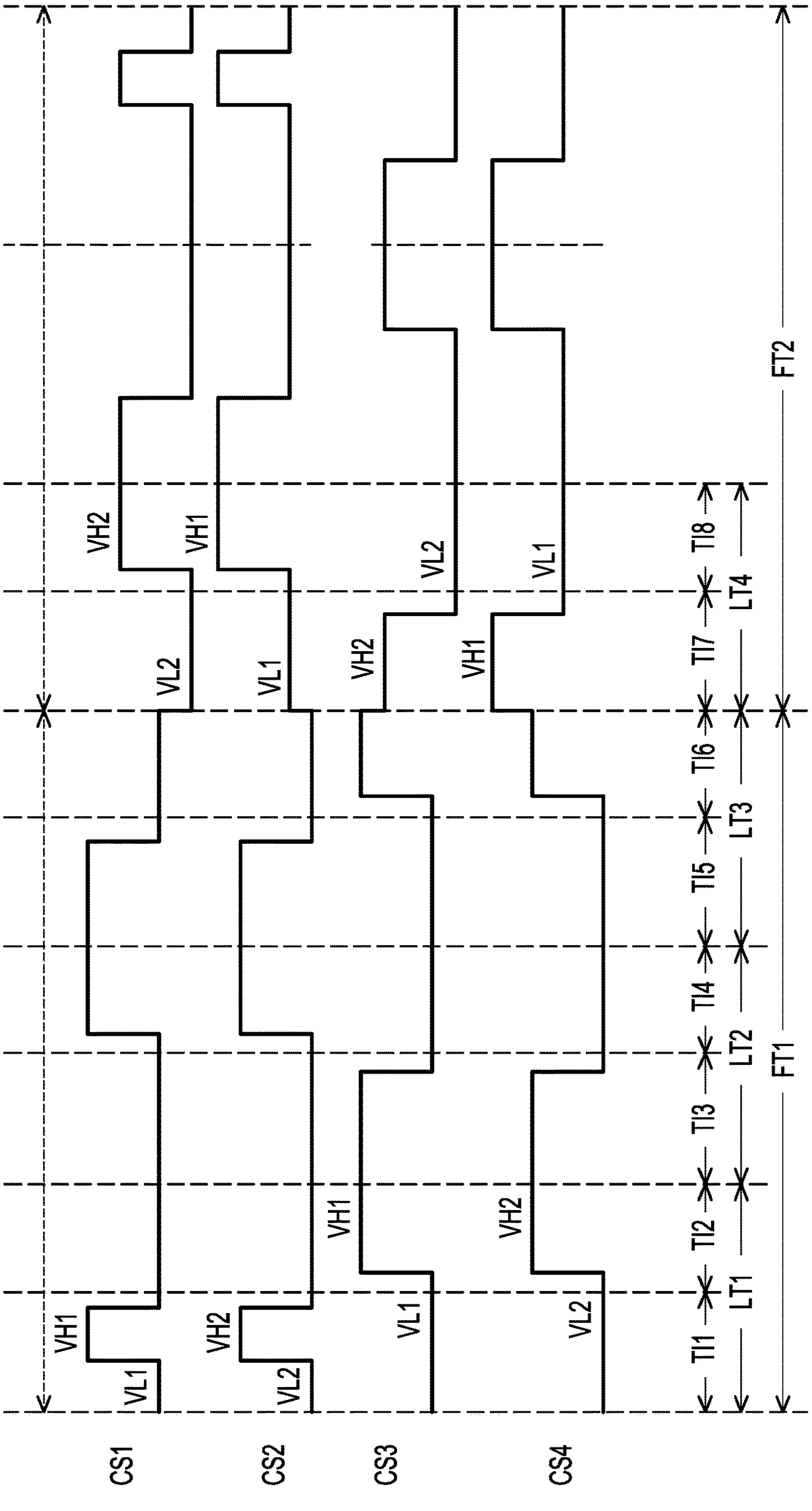
FIG. 4 illustrates an operating waveform of the display device according to some embodiments of the present disclosure.

FIG. 4 illustrates an operating waveform of the display device 1 according to some embodiments of the present disclosure. In FIG. 4, waveforms of the control signals CS1-CS4 are illustrated showing how the control signals CS1-CS4 are switched within a first frame time FT1 and a second frame time FT2. In this embodiment, each frame time is divided into multiple line times, and each line time includes two time intervals. The waveforms of the first control signal CS1 to the fourth control signal CS4 in the first time interval TI1 in FIG. 4 are the same as those in FIG. 2, which are omitted herein.

Figure 5A:
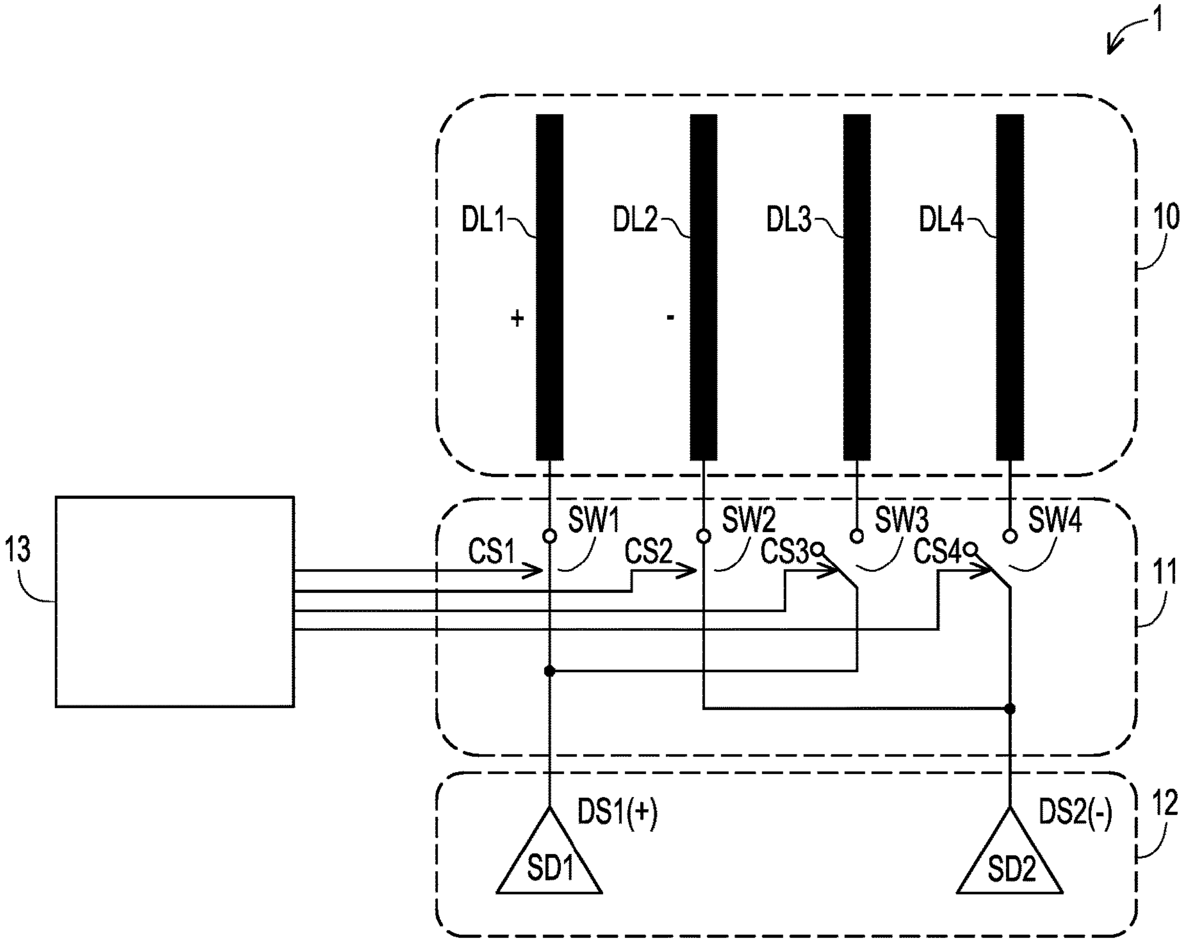
FIG. 5A illustrates operations of the display device during the first time interval in the first line time in FIG. 4 according to some embodiments of the present disclosure.

FIG. 5A illustrates operations of the display device 1 during the first time interval TI1 in the first line time LT1 in FIG. 4 according to some embodiments of the present disclosure. Please refer to FIG. 4 and FIG. 5A together for better understanding the following paragraphs about describing operations of the display device 1 during the first time interval TI1.

In this embodiment, in the first time interval TI1, the first source driver DS1 is configured to generate a first data signal DS1 having the positive polarity, and the second source driver DS2 is configured to generate a second data signal DS2 having the negative polarity. As can be seen in FIG. 2, the first control signal CS1 is switched from a low voltage VL1 (e.g., −5V) to a high voltage level VH1 (e.g., 12V) controlling the first switch SW1 to pass the first data signal DS1 to the first data line DL1. Similarly, the second control signal CS2 is switched from a low voltage level VL2 (e.g., −7V) to a high voltage level VH2 (e.g., 5V) controlling the second switch SW2 to pass the second data signal DS2 to the second data line DL2. However, the third control signal CS3 and the fourth control signal CS4 are respectively kept at the low voltage levels VL1 and VL2.

Specifically, in the second time interval TI2 consecutive to the first time interval, the first source driver SD1 is configured to generate a third data signal DS3 having the positive polarity, and the second source driver SD2 is configured to generate a fourth data signal DS4 having the negative polarity. As can be seen in FIG. 4, the third control signal CS3 is switched from the low voltage level VL1 (e.g., −5V) to the high voltage level VH1 (e.g., 12V) for controlling the third switch SW3 to pass the third data signal DS3 to the third data line DL3. Similarly, the fourth control signal CS4 is switched from the low voltage level VL2 (e.g., −7V) to the high voltage level VH2 (e.g., 5V) for controlling the fourth switch SW4 to pass the fourth data signal DS4 to the fourth data line DL4. Moreover, the third control signal CS3 and the fourth control signal CS4 are respectively kept at the high voltage level VH1, VH2 in the remaining second time interval TI2 while the first control signal CS1 and the second control signal CS2 are respectively kept at the low voltage levels VL1 and VL2.

Figure 5B:
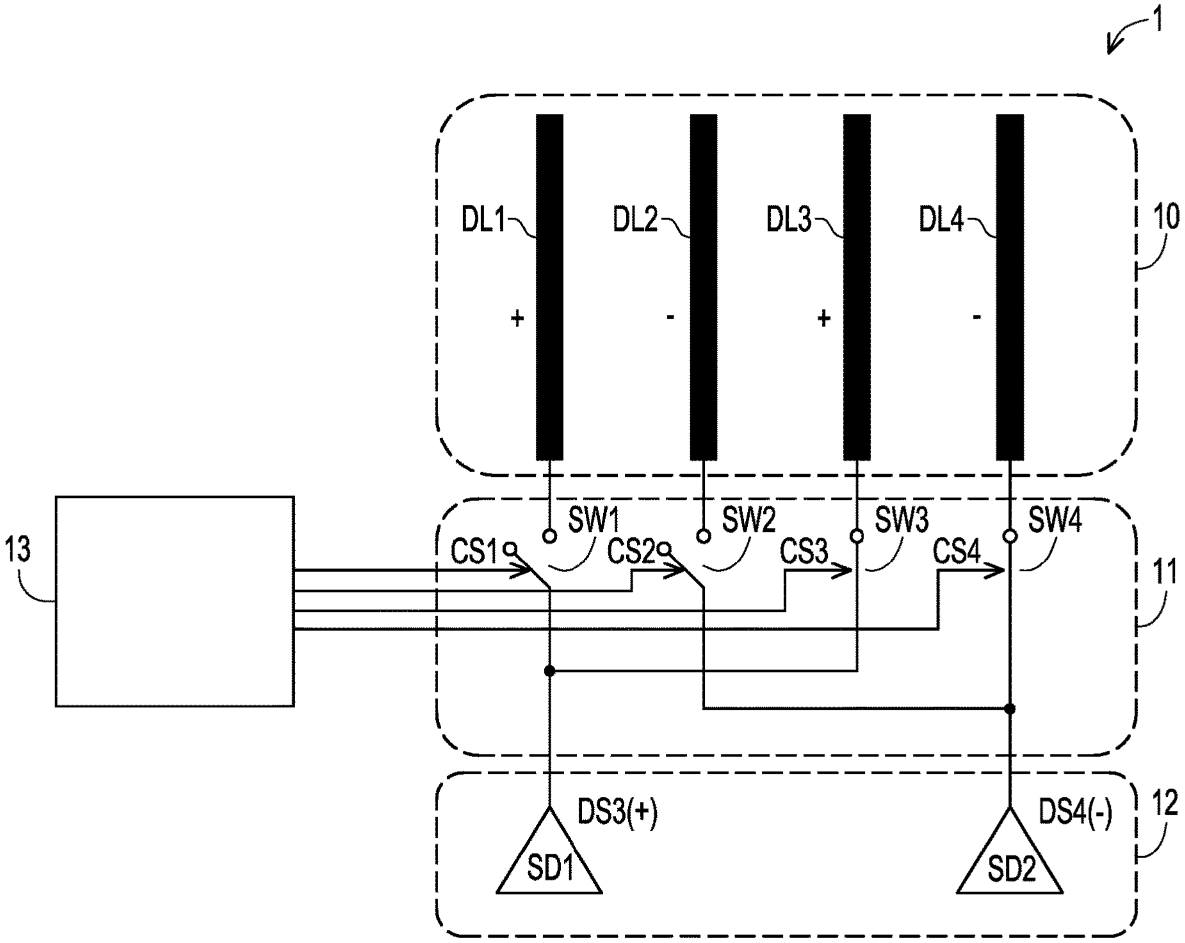
FIG. 5B illustrates operations of the display device during the second time interval in the first line time in FIG. 4 according to some embodiments of the present disclosure.

FIG. 5B illustrates operations of the display device 1 during the second time interval TI2 in the first line time LT1 in FIG. 4 according to some embodiments of the present disclosure. Please refer to FIG. 4 and FIG. 5B together for better understanding the following paragraphs about describing operations of the display device 1 during the second time interval TI2.

Specifically, in the second time interval TI2 consecutive to the first time interval, the first source driver DS1 is configured to generate a third data signal DS3 having the positive polarity, and the second source driver DS2 is configured to generate a fourth data signal DS4 having the negative polarity. As can be seen in FIG. 4, the third control signal CS3 is switched from the low voltage level VL1 (e.g., −5V) to the high voltage level VH1 (e.g., 12V) for controlling the third switch SW3 to pass the third data signal DS3 to the third data line DL3. Similarly, the fourth control signal CS4 is switched from the low voltage level VL2 (e.g., −7V) to the high voltage level VH2 (e.g., 5V) for controlling the fourth switch SW4 to pass the fourth data signal DS4 to the fourth data line DL3. Moreover, the third control signal CS3 and the fourth control signal CS4 are respectively kept at the high voltage level VH1, VH2 in the remaining second time interval TI2 while the first control signal CS1 and the second control signal CS2 are respectively kept at the low voltage levels VL1, VL2.

Figure 5C:
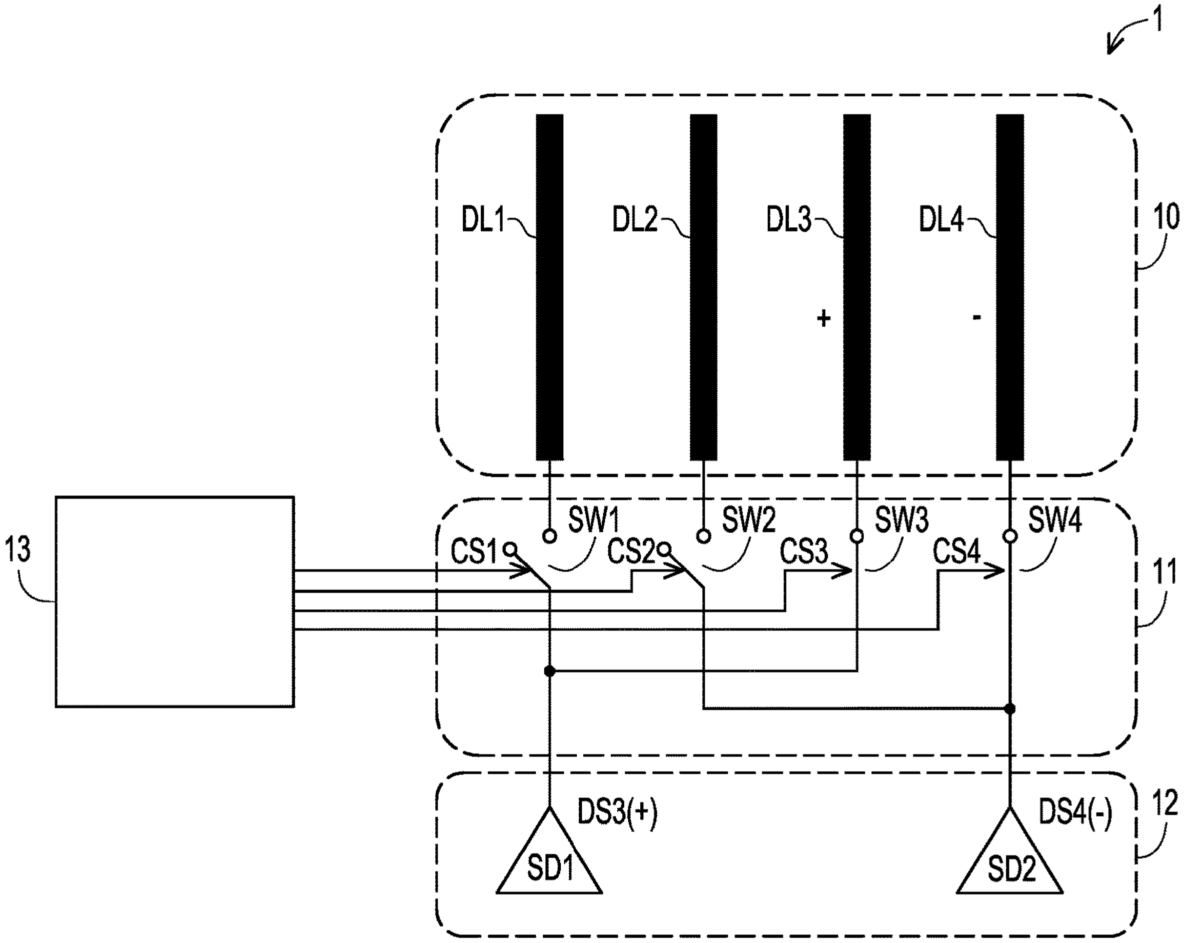
FIG. 5C illustrates operations of the display device during the third time interval in the second line time in FIG. 4 according to some embodiments of the present disclosure.

FIG. 5C illustrates operations of the display device 1 during the third time interval TI3 in the second line time LT2 in FIG. 4 according to some embodiments of the present disclosure. Please refer to FIG. 4 and FIG. 5C together for better understanding the following paragraphs about describing operations of the display device 1 during the third time interval TI3.

Specifically, in the second line time LT2 consecutive to the first line time LT1, the sequence of the first source driver SD1 and the second source driver SD2 driving the first data line DL1 to the fourth data line DLA are reversed. Unlike driving the first data line DL1 and the second data line DL2 in the third time interval TI3 as illustrated in FIG. 2, the source driver SD1 and the second source driver SD2 turn to drive the third data line DL3 and the fourth data line DL4 before driving the first data line DL1 and the second data line DL2 as illustrated in FIG. 4. In order to pass the third data signal DS3 and the fourth data signal DS4, the third control signal CS3 is kept at the high voltage level VH1 and the fourth control signal CS4 is kept at the high voltage level VH2 until the end of the third time interval TI3. Meanwhile, the first control signal CS1 and the second control signal CS2 are respectively kept at the low voltage levels VL1 and VL2. As a result, the first control signal CS1 to the fourth control signal CS4 are all kept unchanged at the edge between the second line time LT2 and the third line time LT3.

Figure 5D:
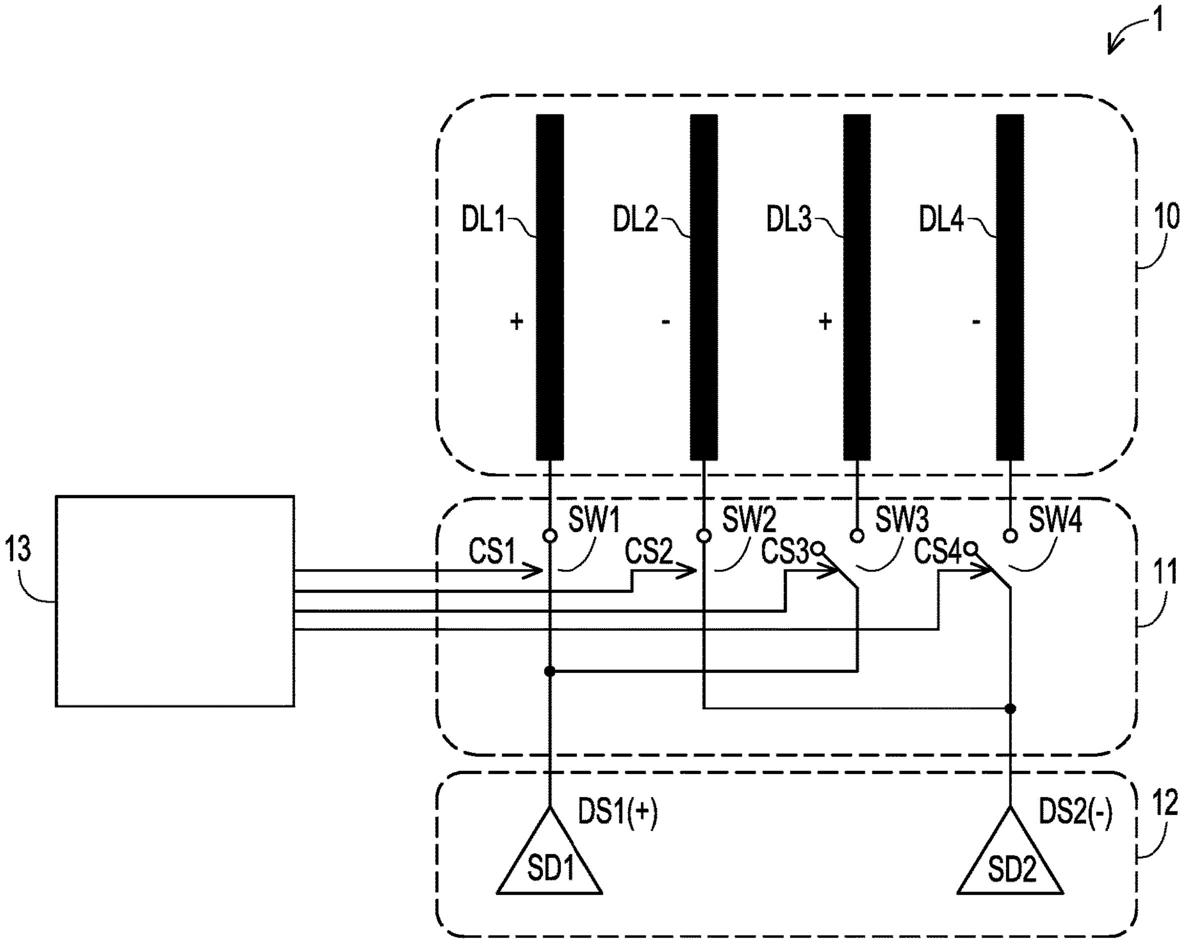
FIG. 5D illustrates operations of the display device during the fourth time interval in the second line time in FIG. 4 according to some embodiments of the present disclosure.

FIG. 5D illustrates operations of the display device 1 during the fourth time interval TI4 in the second line time LT2 in FIG. 4 according to some embodiments of the present disclosure. Please refer to FIG. 4 and FIG. 5D together for better understanding the following paragraphs about describing operations of the display device 1 during the fourth time interval TI4.

Specifically, the first source driver SD1 and the second source driver SD2 are configured to drive the first data line DL1 and the second data line DL2 in the fourth time interval TI4. In order to transmit the first data signal DS1 and the second data signal DS2, the first control signal CS1 is switched to the high voltage level VH1 and the second control signal CS2 is switched to the high voltage level VH2. Meanwhile, the third control signal CS3 and the fourth control signal CS4 are respectively kept at the low voltage levels VL1 and VL2.

Then, in the remaining line times of the first frame time, the sequence of the first source driver SD1 and the second source driver SD2 driving the first data line DLI to the fourth data line DL4 are reversed in any consecutive two time intervals. The reversed driving order leads to less signal toggles of the control signals, and less power consumptions and better EMI of the display device 1.

Moreover, when the display device 1 enters the second frame time FT2, the polarities of the first source driver SD1 and the second source driver SD2 are reversed. In the second frame time FT2, the first source driver SD1 is configured to generate the first data signal DS1 and the third data signal DS3 both with the negative polarity, so the first control signal CS1 and the third control signal CS3 are changed from the first voltage range between VL1 and VH1 to the second voltage range between VL2 and VH2. Similarly, the second source driver SD2 is configured to generate the second data signal DS2 and the fourth data signal DS4 with the positive polarity, so the second control signal CS2 and the fourth control signal CS4 are changed from the second voltage range between VL2 and VH2 to the first voltage range between VL1 and VH1. Therefore, a switching frequency of the control signals being switched can be effectively reduced, further improving power consumption and EMI performance of the display device 1.

Figure 6:
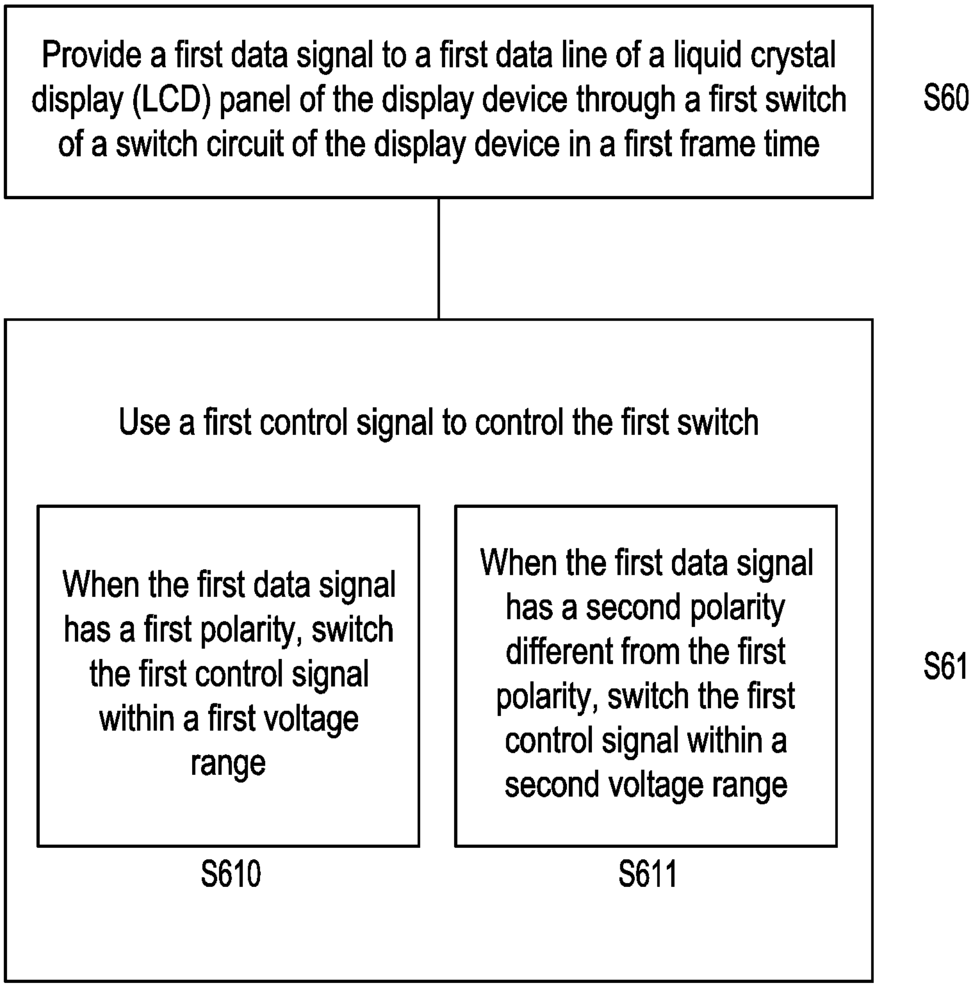
FIG. 6 illustrates a flowchart of an operating method according to some embodiments of the present disclosure.

FIG. 6 illustrates a flowchart of an operating method according to some embodiments of the present disclosure. The operating method in FIG. 6 may be applied to and executed by the display device 1 illustrated in FIG. 1. The operating method includes steps S60 and S61.

In step S60, a first data signal DS1 may be provided to a first data line DL1 of a liquid crystal display (LCD) panel 10 of the display device 1 through a first switch SW1 of a switch circuit 11 of the display device 1 in a first frame time FT1. In step S61, a first control signal CS1 may be used to control the first switch SW1 for selectively transmitting the first data signal DS1 to the first data line DL1. Further, the step S61 includes step S610 and S611. In step S610, when the first data signal DS1 has a first polarity, the first control signal CS1 may be switched within a first voltage range. In step S611, when the first data signal DS1 has a second polarity different from the first polarity, the first control signal may be switched within a second voltage range. Please refer to above paragraphs for greater details of the operating method, which is omitted herein.

Figure 7:
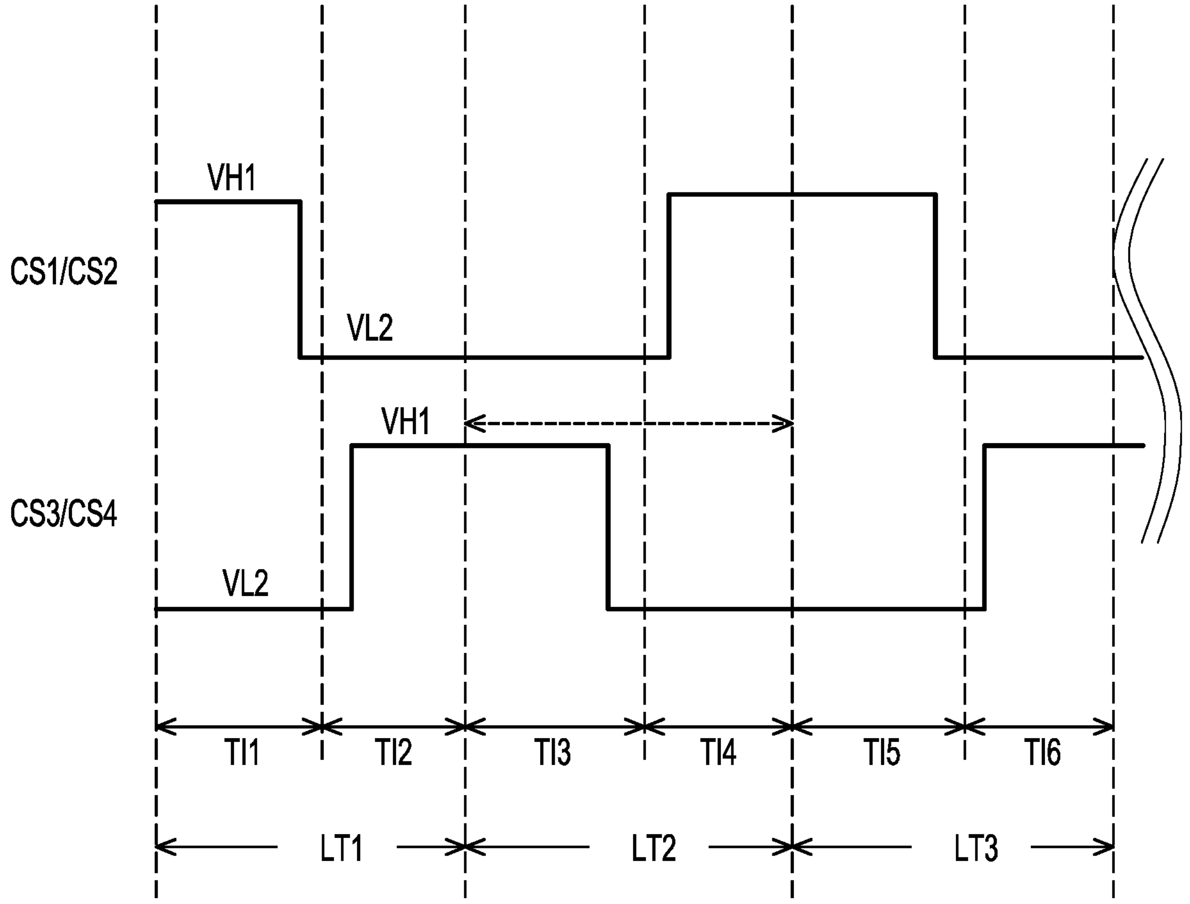
FIG. 7 illustrates an operating waveform of the display device according to some embodiments of the present disclosure.

FIG. 7 illustrates an operating waveform of the display device 1 according to some embodiments of the present disclosure. In FIG. 7, waveforms of the control signals CS1-CS4 are illustrated showing how the control signals CS1-CS4 are switched within each line time. In this embodiment, although not clearly illustrated, each frame time is divided into multiple line times, and each line time includes two time intervals.

As can be seen in FIG. 7, in a first time interval TI1 of a first time LT1, the first control signal CS1 and the second control signal CS2 are kept at the high voltage level VH1 (e.g., 12V). When the display device 1 is entering a second time interval TI2 consecutive to the first time interval TI1, the first control signal CS1 and the second control signal CS2 are switched from the high voltage level VH1 (e.g., 12V) to the low voltage level VL2 (e.g., −7V), and the third control signal CS3 and the fourth control signal CS4 are switched from the low voltage level VL2 (e.g., −7V) to the high voltage level VH1 (e.g., 12V). Then, in the second time interval TI2, the third control signal CS3 and the fourth control signal CS4 are kept at the high voltage level VH1. Therefore, each of the first control signal CS1 to the fourth control signal CS4 only switches once from the high voltage level VH1 to the low voltage level VL2 or from the low voltage level VL2 to the high voltage level VH1 in the middle of each line time. In this way, design complexity of the timing controller 13 may be reduced since the timing controller 13 only needs to output two types of signal waveforms. Meanwhile, since each of the first control signal CS1 to the fourth control signal CS4 only switch once in every time interval, a switching frequency of the control signals can be reduced, and the power consumption and EMI interference of the display device 1 can be reduced.

Figure 8:
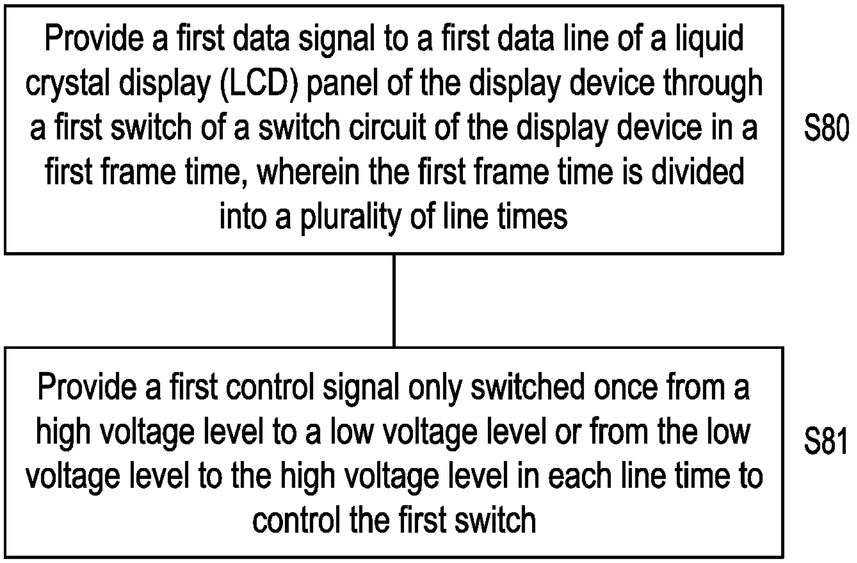
FIG. 8 illustrates a flowchart of an operating method according to some embodiments of the present disclosure.

FIG. 8 illustrates a flowchart of an operating method according to some embodiments of the present disclosure. The operating method in FIG. 8 may be applied to and executed by the display device 1 illustrated in FIG. 1. The operating method in FIG. 8 includes steps S80 and S81.

In step S80, a first-time first data signal is provided to a first data line DL1 of a liquid crystal display (LCD) panel 10 of the display device 1 through a first switch SW1 of a switch circuit 11 of the display device 1 in a first frame time FT1, wherein the first frame time FT1 is divided into a plurality of line times. In step S81, a first control signal CS1 only switched once from a high voltage level VH1 to a low voltage level VL2 or from the low voltage level VL2 to the high voltage level VH1 in each line time is provided to control the first switch SW1.

In summary, the display device and the operating method of the present disclosure may reduce voltage swings and the switching frequency of the control signal, so that the power consumption and EMI interference of the display device may be lessened due to smaller and less toggles of the control signals.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a liquid crystal display (LCD) panel, comprising a plurality of data lines;

a driver circuit configured to provide a first data signal to a first data line of the plurality of data lines in a first frame time;

a switch circuit comprising a first switch configured to provide the first data signal to the first data line according to a first control signal; and a timing controller configured to provide the first control signal switching within a first voltage range to the first switch when the first data signal has a first polarity to control the first switch to pass the first data signal to the first data line, and provide the first control signal switching within a second voltage range different from the first voltage range to the first switch when the first data signal has a second polarity to control the first switch to pass the first data signal to the first data line, wherein the first data signal has the first polarity, wherein the switch circuit further comprises:

a second switch configured to provide a second data signal having the second polarity to a second data line in the first frame time;

wherein the timing controller is configured to provide a second control signal switching within the second voltage range to the second switch for controlling the second switch, wherein the first and second data signals are provided to the first and second data lines within a first time interval in the first frame time, wherein the switch circuit further comprises:

a third switch configured to provide a third data signal having the first polarity to a third data line within a second time interval consecutive to the first time interval in the first frame time; and a fourth switch configured to provide a fourth data signal having the second polarity to a fourth data line within the second time interval; and wherein the driver circuit comprises:

a first source driver coupled to the first and third switches, the first source driver being configured to provide the first and third data signals both having the first polarity within the first time interval and the second time interval; and a second source driver coupled to the second and fourth switches, the second source driver being configured to provide the second and fourth data signals both having the second polarity within the first and second time intervals.

2. The display device of claim 1, wherein a high voltage level and a low voltage level of the first voltage range are respectively higher than a high voltage level and a low voltage level of the second voltage range.

3. The display device of claim 2, wherein the first voltage range is between −5V and 12V and the second voltage range is between −7V and 5V.

4. The display device of claim 1, wherein the first frame time comprises a first line time and a second line time consecutive to the first line time, the first line time comprises the first and second time intervals and the second line time comprises a third time interval consecutive to the second time interval and a fourth time interval, wherein a voltage level of each of the first to fourth control signals is kept the same between the second and third time intervals.

5. The display device of claim 4, wherein each of the first to fourth control signals switch from the high voltage level to the low voltage level or from the low voltage level to the high voltage level once in each time interval.

6. The display device of claim 4, wherein in the first line time, the first and second switches are turned on earlier than the third and fourth switches, but in the second line time, the first and second switches are turned on later than the third and fourth switches.

7. The display device of claim 1, wherein in a second frame time consecutive to the first frame time, the driver circuit is configured to provide the first data signal with the second polarity, and provide the second data signal with the first polarity.

8. The display device of claim 7, wherein in the second frame time, the timing controller is configured to provide the first control signal switching within the second voltage range, and provide the second control signal switching within the first voltage range.

9. An operating method of a display device, the operating method comprising:

providing a first data signal to a first data line of a liquid crystal display (LCD) panel of the display device through a first switch of a switch circuit of the display device in a first frame time;

using a first control signal to control the first switch, wherein: when the first data signal has a first polarity, the first control signal is switching within a first voltage range and is provided to the first switch to control the first switch to pass the first data signal to the first data line; and when the first data signal has a second polarity different from the first polarity, the first control signal is switching within a second voltage range and is provided to the first switch to control the first switch to pass the first data signal to the first data line, wherein the first data signal has the first polarity, wherein the operating method further comprises:

providing a second data signal having the second polarity to a second data line through a second switch of the switch circuit in the first frame time; and using a second control signal switching within the second voltage range to the second switch to control the second switch, wherein the operating method further comprises:

providing the first and second data signals respectively to the first and second data lines within a first time interval in the first frame time: and providing a third and fourth data signals respectively to a third and fourth data lines within a second time interval consecutive to the first time interval in the first frame time, wherein the third data signal has the first polarity and the fourth data signal has the second polarity, and wherein the operating method further comprises:

providing, by a first source driver of the driver circuit of the display device, the first and third data signals both having the first polarity within the first time interval and the second time interval: and providing, by a second source driver of the driver circuit of the display device, the second and fourth data signals both having the second polarity within the first and second time intervals.

10. The operating method of claim 9, wherein a high and low voltage levels of the first voltage range are respectively higher than a high and low voltage levels of the second voltage range.

11. The operating method of claim 10, wherein the high voltage level of the first voltage range is selected from a voltage between 9V and 12V, the low voltage level of the first voltage range is selected from a voltage between −4V and −6V, the high voltage level of the second voltage range is selected from a voltage between 4V and 6V, the low voltage level of the second voltage range is selected from a voltage between −9V and −6V.

12. The operating method of claim 9, wherein the first frame time comprises a first line time and a second line time consecutive to the first line time, the first line time comprises the first and second time intervals, and the second line time comprises a third time interval consecutive to the second time interval and a fourth time interval, wherein the operating method further comprises:

keeping a voltage level of each of the first to fourth control signals the same between the second and third time intervals.

13. The operating method of claim 12, comprising:

changing each of the voltage levels of the first to fourth control signals between the first and second time intervals.

14. The operating method of claim 12, comprising:

turning on the first and second switches earlier than the third and fourth switches in the first line time; and turning on the first and second switches later than the third and fourth switches in the second line time.

15. The operating method of claim 9, comprising:

in a second frame time consecutive to the first frame time, providing the first data signal with the second polarity and providing the second data signal with the first polarity.

16. The operating method of claim 15, comprising:

in the second frame time, providing the first control signal switching within the second voltage range, and providing the second control signal switching within the first voltage range.

* * * * *